United States Patent Office 3,840,629
Patented Oct. 8, 1974

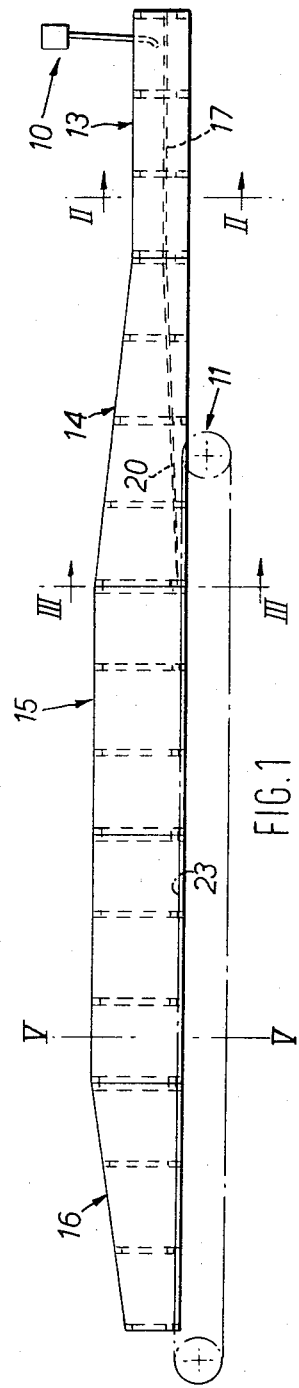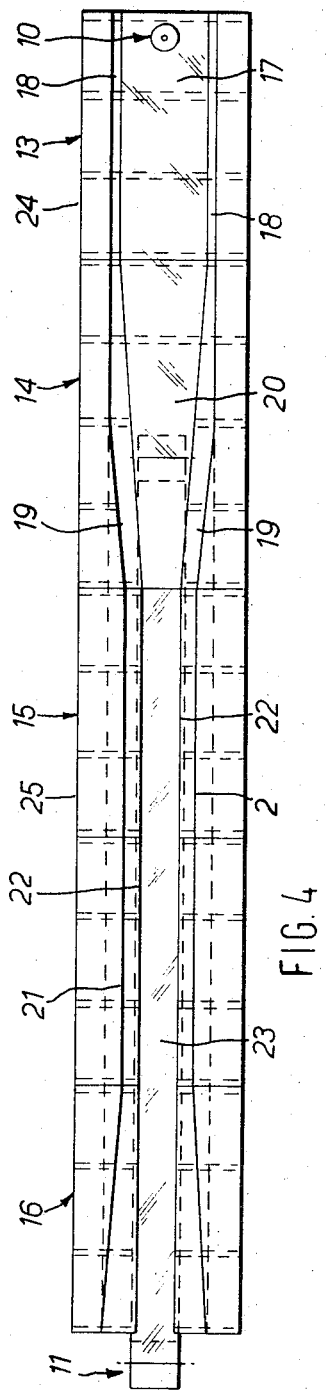

3,840,629
PROCESS AND APPARATUS FOR THE PRODUCTION OF CYLINDRICAL BLOCKS OF SYNTHETIC PLASTIC FOAM
John E. Marjoram, Great Missenden, England, assignor to The Dunlop Company Limited, London, England
Continuation of abandoned application Ser. No. 16,184, Mar. 3, 1970. This applicaton Apr. 11, 1972, Ser. No. 243,064
Claims priority, application Great Britain, Mar. 14, 1969, 13,431/69
Int. Cl. B29d 27/04
U.S. Cl. 264—54
10 Claims

ABSTRACT OF THE DISCLOSURE

Cylindrical blocks of polyurethane foam suitable for peeling into thin sheets are obtained by a method in which a foam-forming reaction mixture is deposited on the flat bottom of a paper trough which is then drawn through a special shaper which changes the shape of the paper trough from the flat bottom form to a substantially cylindrical shape. In a preferred form of the invention cylindrical blocks are obtained without undue wrinkling or stretching of the paper by adopting particular geometric features in the shaper.

---

Figure 2:
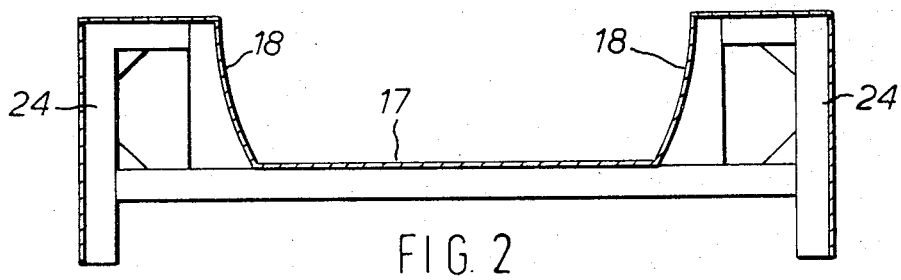

This is a continuation, of application Ser. No. 16,184, filed Mar. 3, 1970 and now abandoned.

This invention relates to a method and apparatus for producing blocks of synthetic plastics mateirals in substantially cylindrical shape. In particular, the invention relates to the production of blocks of polyurethane foam for subsequent conversion into sheeting by a process of peeling.

Polyurethane foam is conventionally obtained by means of a continuous free-rise method which produces a block of substantially rectangular cross-section. Such blocks are subsequently converted by cutting into rectangular slabs suitable for use as mattresses or cushions; but a further use, which has become of greatly increased importance in recent years, is the provision of sheets of flexible polyurethane foam to be used, for example, as laminates with cloth in the clothing industry. A very convenient way of obtaining such sheets is to cut the blocks into lengths corresponding to normal textile width and then obtain the sheet by a method of peeling. The procedure is rather similar to that used in peeling timber logs, and in a similar way it is necessary before peeling to shape the block into a substantially cylindrical form by removing the corners. However, as the corners thus removed are of an irregular shape for which there is no ready market apart from scrap the corner portions of rectangular blocks removed before peeling are virtually waste material, which results in a greatly increased cost of sheet thus obtained.

There has therefore been a demand for a process of producing flexible polyurethane blocks in the desired rounded form, and various proposals have been made to this end. However, these prior proposals, some of which have been put into commercial practice, have been of a complicated nature and require considerable capital expenditure or increased maintenance supervision, or both, to enable satisfactory products to be obtained. For example, in the method described in United Kingdom Specification No. 1,108,734 a substantially cylindrical block is obtained by bringing a foaming polyurethane mass into contact with moving arcuate members arranged in two endless belts, one on either side of the polyurethane mass, the members being brought into contact successively with the polyurethane so as to provide in effect a moving mould whose lower portion at least is of cylindrical shape and thereby producing a corresponding cylindrical shape in the resultant polyurethane product.

A further method which has been proposed in United Kingdom Specification No. 1,075,605 involves the use of two separate flexible moulds, one of which is fed inside the other end, as in the other method described above, this method requires very different apparatus from that conventionally used in providing polyurethane foam blocks and introduces problems which require special care to obtain a satisfactory product.

We have now found according to the present invention that polyurethane foam can be obtained in a continuous manner in substantially cylindrical blocks by a process which is simple to operate and yet involves relatively little extra capital expenditure over that of a conventional polyurethane block machine. Moreover, this process can be operated using a translatable mould of paper or other flexible material which is formed by apparatus common to the conventional moulding machines.

Reference herein to blocks of "substantially cylindrical shape" refers to elongated blocks having a cross-section which is substantially circular, that is, of a rounded shape such that the block can be converted on a peeling machine into sheet without a substantial amount of waste.

In one aspect the present invention provides a continuous method of obtaining a block of synthetic plastics foam of substantially cylindrical shape (as herein defined) which comprises:

(a) depositing at a deposit station a foam-forming composition in an alongated translatable flexible mould of substantially rectangular shape;
(b) drawing the mould away from the deposit station and towards a discharge station for the resulting plastics foam block through a stationary shaper having concave side members which progressively change the cross-sectional shape of the mould to a substantially circular shape before the foam has completed its rise; and
(c) supporting the mould so as to maintain its foam contents in a substantially circular cross-sectional shape until the foam has become self-supporting.

The shaper conveniently consists of three portions arranged end-to-end longitudinally and comprising a first portion in the form of a flat-bottomed trough, a round portion providing the shape required in the finished product and having opposed concave members and an intermediate portion joining the trough and round portions and so shaped as to provide a progressive change of cross-section of the shaper from the flat-bottomed U cross-section of the trough portion to the rounded cross-section of the round portion. Such a shaper has no moving parts and consequently required little maintenance. It can be regarded as an elongated trough whose cross-section varies progressively from a flat-bottomed U at one end (into which the flexible trough is fed) to a rounded cross-section at the other end.

To avoid undesirable wrinkling or stretching of the flexible mould the trough, intermediate and round portions of the shaper should be geometrically correct, that is, the length of that part of the periphery of the cross-section of the shaper lying under and terminated by the plane passing through the centre line of the round portion and parallel to the bottom of that portion should be the same along the shaper.

The invention is particularly concerned with the production of blocks of flexible polyurethane foam in a paper mould, and the following description is with particular reference to that aspect of the invention.

The means for drawing the flexible trough along the shaper is preferably a conveyor aligned with the shaper and running immediately beneath it. This conveyor should be preferably of the trough or concave belt type, so that maximum grip on the curved underside of the round block can be obtained, though a conventional flat conveyor can well be used. The bottom would normally be parallel to the conveyor and approximately 4 to 5 inches above it if fitted to an existing conventional foaming machine, but in any case should preferably decline to the horizontal at a variable and controlled angle, for instance between 1 to 4½°. This angle is set according to the type and formulation of the foam being made, and in general the greater the viscosity of the mix the steeper the angle required. The inner surface of the shaper should be smooth enough to avoid undesirable drag on the flexible mould. Preferably the inner surface is polished smooth.

The round portion of the shaper has its concave members spaced apart at the upper edges so as to allow the rising mass of foam to rise between them. In this way, there is no need, provided that the appropriate conditions are chosen, to have any device to provide the desired rounded top to the polyurethane foam. It is well known in the art that polyurethane foam rising in a rectangular mould such as is used in the conventional continuous process of loaf production will, unless special measures are taken, produce a curved upper surface. In the present invention advantage is taken of this feature—which is an undesirable one in the conventional production of polyurethane foam—and by suitably adjusting the distance apart of the concave members a substantially cylindrical block of foam can be obtained. The concave members of the round portion of the shaper are preferably spaced apart at their lower edges so as to leave a gap or gulley between them whereby the flexible mould and its contents ride upon the conveyor and are drawn along by it.

The present invention also comprises apparatus for the manufacture of blocks of synthetic plastics foam of substantially cylindrical shape which comprises a conveyor to advance an elongated flexible mould between first and second stations; a shaper having concave side members to change the shape of the mould from a flat-bottomed form at the first station to a substantially circular shape intermediate said first and second stations; means to deposit a foam-forming composition onto the flat bottom of the mould at the first station; and means to discharge the block at the second station.

As can be seen by reference to the accompanying drawings, blocks of foam obtained by this preferred embodiment of the invention, that is using a conveyor to support and draw along the paper mould, do not result in a block of truly circular cross-section because if, as is usually the case, the conveyor is flat the resulting block has a flat portion at its base, but it has been found that this flat portion need not be very wide and can be as little as one quarter or even less of the diameter of the block obtained. Similarly, the curved upper surface of the resultant block is not necessarily coincident with the curve obtained by extrapolating the curves of the concave members. However, in practice it is found that such divergences from a truly circular cross-section are not very important in the peeling of the resultant polyurethane block or log.

A great advantage of the present invention is that it can utilise conventional apparatus for forming the paper trough and for feeding to it the liquid reaction mixture. Moreover the reaction mixture can be of a conventional composition. The speed of translation of the mould along the shaper should be adjusted with respect to the amount of rise of the polyurethane foam so that the maximum rise of the polyurethane foam occurs within the round portion of the shaper. Naturally the size of the paper mould and the amount of the reaction mixture fed to it are adjusted so that the desired curved upper surface is obtained but this is a matter which presents no serious problems to skilled people in the art.

There now follows a description of one embodiment of apparatus according to the present invention, which is illustrated in the accompanying drawings, suitable for use in the production of substantially cylindrical blocks of flexible polyurethane foam.

Figure 3:
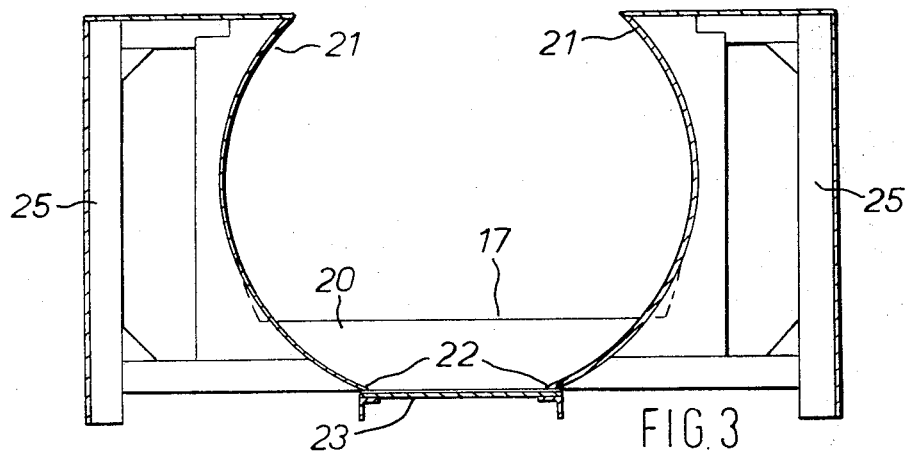
Figure 5:
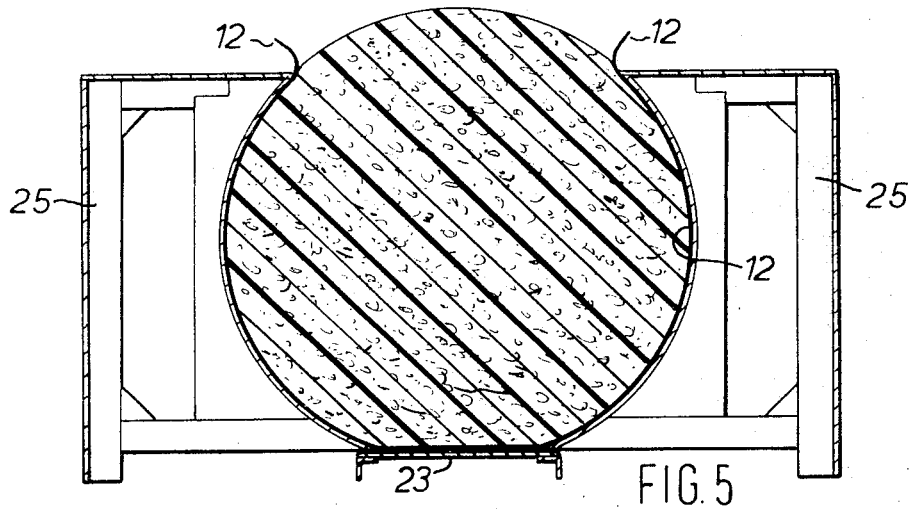

In the drawings:

FIG. 1 is a side elevation of the apparatus;
FIG. 2 is a cross-section of the trough portion of the shaper taken on the line II—II in FIG. 1;
FIG. 3 is a cross-section on the line III—III at the junction of the intermediate and round portions of the shaper;
FIG. 4 is a plan view of the apparatus; and
FIG. 5 is a cross-section on the line V—V of FIG. 1 but showing the shaper containing a flexible paper mould filled with polyurethane foam which has expanded into a substantially cylindrical shape.

The apparatus has feed means 10 to feed a foam-forming reaction mixture into a flexible translatable mould (12, FIG. 5), a conveyor 11 for the mould, and an elongated stationary shaper.

The feed means can be a conventional reciprocating feed pipe supplied by an electrically-driven mixer for the various ingredients.

The shaper consists of three contiguous shaper portions 13, 14 and 15 arranged longitudinally end-to-end and referred to below respectively as the trough, intermediate and round portions.

The first or trough portion 13 is in the form of a trough of substantially rectangular cross-section as shown in FIG. 2 and having a flat rectangular bottom member 17, 6 feet long and 28 inches wide and two outwardly-inclined arcuate side members 18 each having a radius of 21 inches and extending upwardly from the margins of the bottom member which declines to the horizontal at an angle of 1–4½ degrees.

The trough portion is preferably of such a length that the commencement of foaming (creaming) of the polyurethane foam-forming reaction mixture occurs in this portion, preferably about 3–4 feet, say 2 feet, from the end thereof where it joins the intermediate portion.

The trough portion of the shaper communicates with the round portion 15 by means of an intermediate portion 14 whose base is declined to the horizontal at a greater angle than the trough portion. This intermediate portion has two converging arcuate side members 19 extending upwardly from the margins of a base member 20 whose width progressively decreases towards the round portion with convergance of the side members. As the sides converge along their length they also progressively change from the substantially flat form they have where the intermediate portion joins the trough portion to a concave shape where it points the round portion of the shaper so that where the intermediate portion joins the round portion its cross-sectional shape is the same as that of the round portion whose description now follows.

The round portion 15 consists of two like opposed concave members 21 of arcuate form. Thus each member consists of a portion of a notional regular cylinder, the two members having about 8 inches separating their opposed lower edges 22 and about 22 inches separating their upper edges. The maximum distance between the members, that is the diameter of the notional cylinder of which they form part is 33 inches. The trough, intermediate and round portions of the shaper together constitute a means for changing the cross-section of a flexible lining mould when drawn through the shaper from that of a substantially rectangular shape to a substantially circular shape. In the continuation 16 of the round section 15 the two concave members are of progressively reduced height until at the end of the shaper the tops of the concave members are at the height of the horizontal diameter of the notional cylinder of which the form part. The purpose of this progressive reduction in height is to reduce the frictional resistance offered by the shaper to the paper mould, while adequately supporting the cylindrical block of foam.

The shaper comprises sheets of plywood having bonded to their inner faces sheets of melamine resin to reduce friction between the shaper and the paper trough. The curved members comprising the shaper are supported by a frame work 24, 25 shown in FIGS. 2 and 3 respectively.

The shaper is mounted over an adjustable inclined conveyor belt 23 of conveyor 11, which runs under the lower gap between the two concave members to provide means to support and to convey the flexible mould and its contents.

The apparatus has conventional means for supplying paper to form the flexible paper mould, for stripping the paper from the moulded polyurethane and for cutting the polyurethane into blocks at the discharge station. These features are not shown in the drawings.

The method of the invention is illustrated by the following Example.

EXAMPLE

In operation paper is supplied as a single sheet from a take-off roll (not shown) and formed into the shape of a trough mould fitting snugly within the trough portion 13 of the shaper by conventional means. The reaction mixture is deposited on the bottom of the mould at the deposit station by the reciprocating feed head, and as it is carried forward by the moving paper through the mixture foams and rises in the paper mould. The moving paper mould carries the foaming mass along the shaper to the intermediate portion 14 where the paper mould is progressively shaped until, as it moves into the round portion 15 the walls of the mould, being in close sliding contact with the concave members 21 of the shaper conform to the shape thereof. As the mould moves into the round portion its bottom comes into contact with the conveyor belt 23 which carries it forward and thereby (together with the declination of the trough and intermediate portion of the shaper to the horizontal) provides the means of drawing forward the mould through the trough and intermediate portion of the shaper. On leaving the portion 16 of the shaper the cylindrical block of foam, being now self-supporting, is carried away on a second conveyor belt (not shown) the adhering paper mould is removed and the block is cut into convenient lengths.

By suitable adjustment of the formulation used for the reaction mixture and the speed of the conveyor the completion of rise of the foam is effected at the most appropriate region of the shaper which is in the round portion, preferably from 1 to 3 feet from the junction of that portion with the intermediate portion. By appropriate choice of the rate of feed of the reaction mixture to the trough, a substantially cylindrical mass of foam can be obtained because the natural rise of the foam provides a "loaf" having a curved top or crust which protrudes above the upper edges of the concave members (FIG 5).

The dimensions of the shaper and of the paper mould should be such that at the place of maximum rise of the foam the top edges of the paper mould are above the top edges of the concave members, but preferably by an amount which does not interfere with the formation of the desired rounded upper surface of the foam.

By means of the method just described a block of flexible polyurethane foam of substantially cylindrical shape was obtained. It was found that the curved top surface of the block was a little above the upper part of the notional cylinder of which the concave members form part, and the bottom of the foam block had a flat portion corresponding to the gap between the lower edges of the concave members. However, these divergences from a truly circular cross-section were found not to be of great importance when the block was subsequently peeled into sheet form. The foam block was of excellent quality and without splits.

Having described my invention what I claim is:

1. A continuous method of manufacturing a substantially cylindrical block of synethetic plastics foam comprising:
   (a) depositing at a deposit station the reaction mixture for said synthetic plastics foam on an elongated open top longitudinally movable flexible mould while altering the shape of said mould into a substantially rectangular shape, the quantity deposited being sufficient to form a loaf effect at the top;
   (b) moving said mould by exerting a longitudinal force only along the bottom thereof to draw the mould from said deposit station toward a discharge station;
   (c) altering the shape of said mould by passing said mould through a stationary concave shaper and progressively shaping said mould against the inner sides of said shaper as said mound moves toward said discharge station for conforming said mould into the cross-sectional shape of the shaper, said shaper being of a form which both supports and progressively changes the cross-sectional shape of the mould to a substantially circular shape before the foam has completed its rise and becomes self-supporting.

2. The method of claim 1 in which the periphery of the cross-section of the shaper lying under a plane passing through the center line of the round portion and parallel to the bottom of that portion is the same along the length of the shaper to avoid wrinkling or stretching of the flexible mould.

3. A method according to claim 1, in which the shaper comprises three portions arranged end-to-end longitudinally: a first portion being in the form of a flat-bottomed trough, a round portion providing the shape required in the finished product and comprising opposed concave members, and an intermediate portion joining the trough and round portions and so shaped as to provide a progressive change of cross-section of the shaper from the flat-bottomed cross-section of the trough portion to the rounded cross-section of the round portion.

4. A method according to claim 1, in which the shaper comprises an elongated trough whose cross-section varies progressively from a flat-bottomed U at one end (into which the flexible trough is fed) to a rounded cross-section at the other end.

5. A method according to claim 3, in which said concave members are spaced apart at their upper edges so as to allow the rising mass of foam to rise between them and thereby provide the curved top of the block.

6. A method according to claim 1, in which the means for drawing the flexible trough along the shaper is a conveyor aligned with the shaper and the concave members of the third portion of the shaper are spaced apart at their lower edges so as to leave a gap or gulley between them whereby the flexible mould and its contents ride upon the conveyor and are drawn along by it.

7. A method according to claim 1, in which the reaction mixture is for a flexible polyurethane foam.

8. An apparatus for the continuous manufacture of substantially cylindrically shaped block of synthetic plastics foam comprising:
   (a) a stationary shaper having three portions arranged end-to-end longitudinally; a first portion being a flat-bottomed trough, a third portion being substantially circular in cross-section with an open top and a second portion intermediate the first and third portions shaped to provide a progressive change of cross-section from the flat-bottomed trough to the rounded-cross-section;
   (b) a longitudinally moveable flexible mould within said stationary shaper;
   (c) conveyor means along the bottom of at least said third portion for moving the mould through the shaper;
   (d) means adjacent the first portion of the shaper to deposit a foam-forming composition onto the flat-bottom part of the mould.

9. The apparatus of claim 8 in which the sides of at least the third portion of the stationary shaper are concave members spaced apart at their lower edges so as to leave a gap therebetween and the conveyor means is located in the gap to drive the flexible mould only along its bottom, the top being open to permit rise of a loaf effect in the foam as it forms and curves.

10. The apparatus of claim 8 in which the periphery of the cross-section of the shaper lying under a plane passing through the center line of the third portion and parallel to the bottom of that portion is the same along the length of the shaper to avoid wrinkling or stretching of the flexible mould.

References Cited
UNITED STATES PATENTS

| | | | |
|---|---|---|---|
| 3,281,894 | 11/1966 | Buff et al. | 264—54 X |
| 3,296,658 | 1/1967 | Buff et al | 264—54 UX |
| 3,325,573 | 6/1967 | Boon et al. | 264—54 |
| 3,476,845 | 11/1969 | Buff et al. | 264—5 |
| 3,488,800 | 1/1970 | Kornylak | 264—54 UX |
| 3,496,596 | 2/1970 | Buff | 264—54 UX |

PHILIP E. ANDERSON, Primary Examiner

U.S. Cl. X.R.

264—216; 425—4 C